US006766491B2

(12) United States Patent
Busser (10) Patent No.: US 6,766,491 B2
(45) Date of Patent: Jul. 20, 2004

(54) PARITY MIRRORING BETWEEN CONTROLLERS IN AN ACTIVE-ACTIVE CONTROLLER PAIR

(75) Inventor: Richard W. Busser, Longmont, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 615 days.

(21) Appl. No.: 09/852,858

(22) Filed: May 9, 2001

(65) Prior Publication Data

US 2002/0170017 A1 Nov. 14, 2002

(51) Int. Cl.[7] .......................... G11C 29/00; G06F 11/10; G06F 11/20; G06F 12/16
(52) U.S. Cl. .......................... 714/770; 711/114; 714/6; 714/763; 714/766; 714/767
(58) Field of Search ............................. 711/114; 714/6, 714/763, 766–767, 770

(56) References Cited

U.S. PATENT DOCUMENTS

| | | | | |
|---|---|---|---|---|
| 5,341,381 | A | | 8/1994 | Fuller ........................ 371/10.1 |
| 5,522,032 | A | | 5/1996 | Franaszek et al. ..... 395/182.04 |
| 5,774,643 | A | * | 6/1998 | Lubbers et al. ................ 714/20 |
| 5,819,109 | A | | 10/1998 | Davis ........................ 395/835 |
| 5,864,655 | A | | 1/1999 | Dewey et al. ......... 395/182.05 |
| 6,606,683 | B2 | * | 8/2003 | Mori ........................... 711/114 |
| 2002/0053010 | A1 | * | 5/2002 | Piccirillo et al. ........... 711/170 |
| 2002/0133735 | A1 | * | 9/2002 | McKean et al. ................ 714/5 |
| 2002/0170017 | A1 | * | 11/2002 | Busser ....................... 714/800 |

* cited by examiner

Primary Examiner—R. Stephen Dildine
(74) Attorney, Agent, or Firm—Sheridan Ross P.C.

(57) ABSTRACT

A system and method for efficient parity mirroring between controllers of an active-active controller pair in a redundant array of inexpensive disks (RAID) system is disclosed. When a second controller in an active-active controller pair receives new data to be written to a disk array, it mirrors the new data to a first controller in the active-active controller pair. The second controller then computes new parity for the data stripe associated with the new data. The second controller then opens a parity log and mirrors logical block address (LBA) information for the new data to a first controller in the active-active controller pair. In the event of a failure of the second controller after mirroring the LBA information and prior to completing the write operation, the first controller uses the LBA information to complete the write operation, assuring that the new data and new parity are properly stored on the disk array. If a hard disk in the disk array fails, parity is mirrored between the first and second controllers, rather than just LBA information. If a hard disk and the second controller fail when the first controller contains LBA information, a list containing the LBAs is created and a media error is returned in the event that a host requests in the form of a read operation data contained in the listed LBAs.

19 Claims, 8 Drawing Sheets

PARITY MIRRORING BETWEEN CONTROLLERS IN AN ACTIVE-ACTIVE CONTROLLER PAIR

FIELD OF THE INVENTION

The present invention relates to performance enhancements for redundant array of inexpensive disks (RAID) storage systems and more particularly to a method and system for enhancing performance of mirroring operations between controllers in an active-active controller pair.

BACKGROUND OF THE INVENTION

A typical data processing system generally includes one or more storage units which are connected to a host computer either directly or through a control unit and a channel. The function of the storage units is to store data and other information (e.g., program code) which the host computer uses in performing particular data processing tasks.

Various types of storage units are used in current data processing systems. A typical system may include one or more large capacity tape units and/or disk drives connected to the system through respective control units for storing data. However, a problem exists if one of the storage units fails such that information contained in that unit is no longer available to the system. Generally, such a failure will shut down the entire computer system, which can create a problem for systems which require data storage systems to have high availability.

This problem has been overcome to a large extent by the use of Redundant Array of Inexpensive Disks (RAID) systems. RAID systems are widely known, and several different levels of RAID architectures exist, including RAID 1 through RAID 5, which are also widely known. A key feature of a RAID system is redundancy, which is achieved through the storage of a data file over several disk drives and parity information stored on one or more drives. If one disk drive fails, then the RAID system is generally able to reconstruct the data which was stored on the failed drive from the remaining drives in the array.

High availability is a key concern because in many applications users rely heavily on the data stored on the RAID system. In these type of applications, unavailability of data stored on the RAID system can result in significant loss of revenue and/or customer satisfaction. Employing a RAID system in such an application enhances availability of the stored data, since if a single disk drive fails, data may still be stored and retrieved from the system. In addition to the use of a RAID system, it is common to use redundant RAID controllers to further enhance the availability of such a storage system. In such a situation, two or more controllers are used in a RAID system, where if one of the controllers fails the other remaining controller will assume operations for the failed controller. Such a platform enhances the availability of a RAID system because the system can sustain a failure of a controller and continue to operate. When using dual controllers, each controller may conduct independent read and write operations simultaneously, known as an active-active configuration. It can be advantageous in certain applications to use the active-active configuration, as the RAID system can support relatively high rates of data transfer between the disks and host, although employing an active-active configuration requires mirroring of data and parity between controllers to maintain redundancy, as will be described in detail below.

Figure 1:
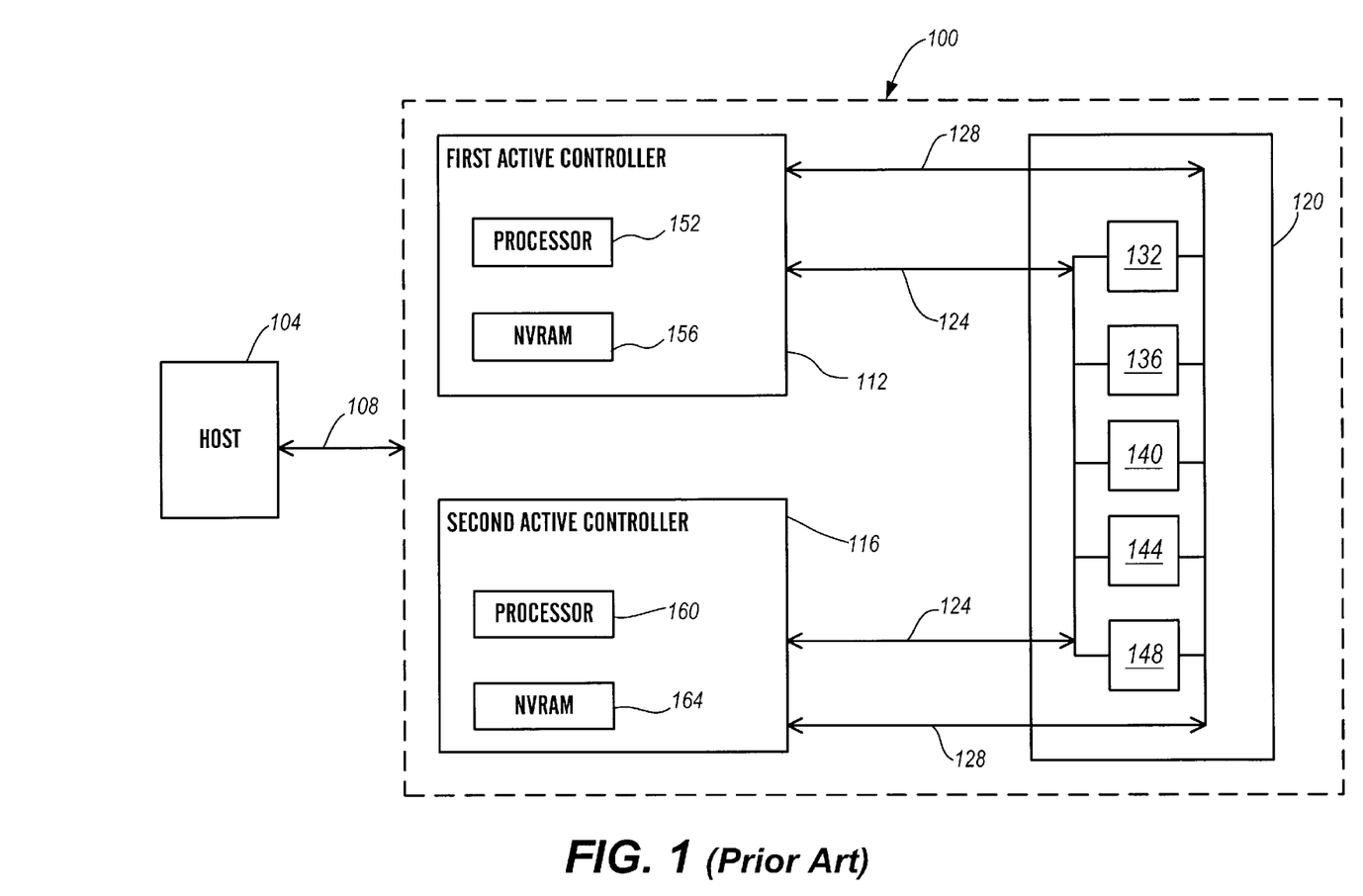
FIG. 1 is a block diagram representation of a RAID system utilizing an active-active controller pair.

With reference to FIG. 1, a RAID system 100 having an active-active controller pair is described. The RAID system 100 is connected to a host computer 104 through a host channel 108. The RAID system 100 includes a first active controller 112, a second active controller 116, and a disk array 120. The disk array 120 is connected to the first active controller 112 by a first disk channel 124 and a second disk channel 128, and to the second active controller 116 by the first and second disk channels 124, 128. The disk array 120 contains a number of disk drives 132, 136, 140, 144, 148, that are used for data storage. Within the first active controller 112, there is a processor 152 and a nonvolatile random access memory (NVRAM) 156, and within the second active controller 116 there is a processor 160 and a NVRAM 164. It should be understood that the number of drives shown in FIG. 1 are for the purpose of discussion only, and that a RAID system 100 may contain more or fewer disk drives than shown in FIG. 1. Data is written to the disk array 120 in such a way that if one drive fails, data can continue to be read from and written to the disk array 120. How this redundancy is accomplished depends upon the level of RAID architecture used, and is well known in the art.

When storing data, generally, a controller receives the data and breaks the data down into blocks which will be stored on the individual disk drives 132, 136, 140, 144, 148. The blocks of data are then arranged to be stored on the drives 132, 136, 140, 144, 148. In arranging the blocks of data, the controller organizes the blocks into stripes and generates a parity block for each stripe. The data is written across several drives, and the parity for that stripe is written to one disk drive. In certain cases, the data may not be large enough to fill a complete stripe on the RAID system. This is known as a non-full stripe write. When the data sent to the controller occupies a full stripe, the data is simply written over existing data and the parity is written over the existing parity. Additionally, in certain cases, the controller may aggregate several small writes together to create a full stripe of data, which the controller treats as a full stripe of data for purposes of generating parity. However, in the case of a non-full stripe write, modifying the stripe of data requires several steps, and is a disk intensive activity.

The occurrence of non-full stripe writes is common in many applications, such as financial, reservation and retail systems, where relatively small data records are widely used and are accessed and modified at random. When an individual customer record needs to be revised, it may reside in a stripe of data that contains several other customer data records. In such a case, only a portion of the stripe needs to be modified, while the remainder of the stripe remains unaffected by the modification of the data.

As mentioned above, when using an active-active controller pair in a RAID system, in order to maintain redundancy, data and parity must be mirrored between the controllers in the active-active system. In such a system, when the host computer 104 sends data to be written to the disk array 120, the data is typically sent to either the first active controller 112, or the second active controller 116. Where the data is sent depends upon the location in the disk array 120 the data will be written. In active-active systems, typically one controller is zoned to a specific array of drives, or a specific area within an array of drives. Thus, if data is to be written to the array that the first active controller 112 is zoned to, the data is sent to the first active controller 112. Likewise, if the data is to be written to an array that the second active controller 116 is zoned to, the data is sent to the second active controller 116. In order to maintain redundancy between the two controllers 112, 116, the data sent to the first active controller 112 must be copied onto the second active controller 116. Likewise, the data sent to the second active controller 116 must be copied onto the first active controller 112. The data is copied between controllers because, for example, if the first active controller 112 suffers a failure, the second active controller 116 can then use the copy of the data to complete any data writes which were outstanding on the first active controller 112 when it failed. This process of copying data, as well as parity, is known as mirroring.

Mirroring in such a system is typically necessary because when the host 104 sends data to be written, the controller that receives the data, stores the data in a memory location, and sends a reply to the host 104 that the write is complete. Thus, even though the data may not have been written to the disk array 120, the host 104 is notified that it has been written. This is known as write-back caching. If the controller that received the data subsequently suffers a failure prior to writing the data to the disk array 120, the data can be lost. However, if the controller mirrors the data prior to sending the host 104 a reply that the data has been written, a failure of the controller can still be recovered without loss of the data. The recovery from the failure, as will be described below, is performed by the surviving controller, which takes control of the operations of the failed controller. This process of recovering from a controller failure is known as "failing over," and the surviving controller is known to be in a "failed over" mode when performing operations of the failed controller.

Figure 2:
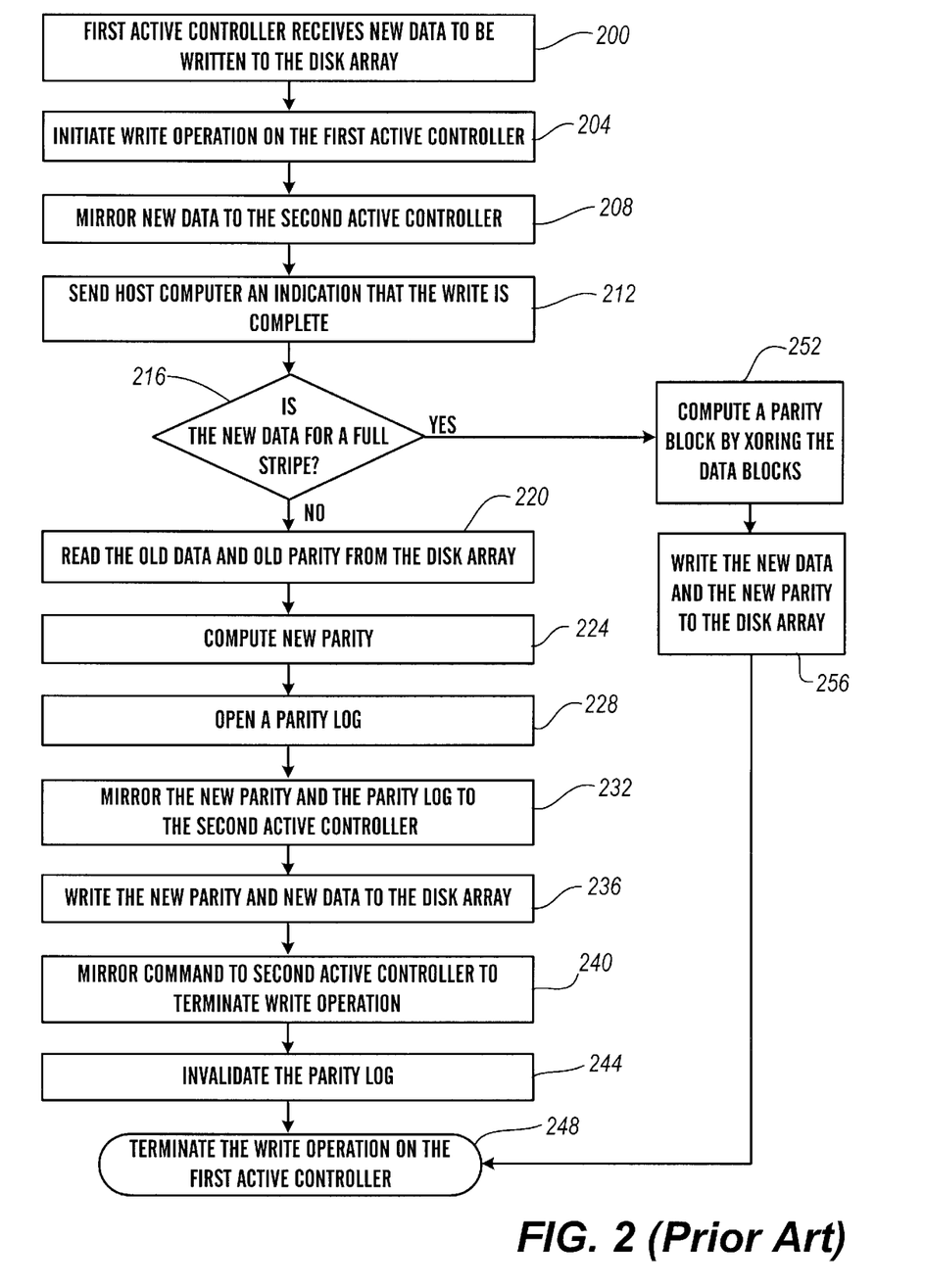
FIG. 2 is a flow chart representation of a write operation using an active-active controller pair.

With reference now to FIG. 2, a flow chart representation of a data write is now described. Initially, indicated by block 200, the first active controller 112 receives new data to be written to the disk array 120 and stores the data in NVRAM 156. The first active controller 112 next initiates a write operation, as noted by block 204. The first active controller 112 then takes steps to mirror the new data to the second active controller 116, and data is stored in the NVRAM 164 of the second active controller 116, and a mirror write operation is initiated within the second active controller 116, as indicated by block 208. The mirror write operation indicates that there is an outstanding write operation on the first active controller 112, which can be used to recover the system in the event of a failure of the first active controller 112, and will be discussed in more detail below. Once the new data has been mirrored to the second active controller 116, the first active controller 112 sends the host computer 104 an acknowledgment that the write of the new data is complete, according to block 212. Next at block 216, the first active controller 112 processes the data into blocks for storage on the disk array 130 and determines if the blocks of new data will occupy a full stripe in the disk array 130.

Referring to block 220, if the new data will not occupy a full stripe in the disk array 130, the first active controller 112 reads the old data and old parity from the disk array 130. The first active controller 112 then computes new parity by XORing the old data and old parity with the new data, and stores the new parity in its NVRAM 156, as indicated by block 224. Next, a parity log is opened on the first active controller 112, as noted by block 228. The parity log is also stored in NVRAM 156, and contains pointers to the memory storage location of the parity data and user data, the location in the drives where the data will be stored, the serial number for the drives being written, the serial number of the array the drives belong to, and an array offset. Next in block 232, the first active controller 112 mirrors a parity log message to the second active controller 116. The parity log message contains the new parity, and also includes the parity log, both of which are stored in the NVRAM 164 on the second active controller 116. Accordingly, by mirroring the parity, in the event of a failure of the first active controller 112, the second active controller 116 is able to complete the write of the new data and new parity, as will be described in more detail below. With reference to block 236, the first active controller 112 next issues write commands to write the new data and new parity to the disk array 130. Once the first active controller 112 receives acknowledgment from the disk array 130 that the data and parity writes are complete, the first active controller 112 mirrors a command to the second active controller 116 to close the mirror write operation, as indicated by block 240. Next at block 244, the first active controller 112 invalidates the parity log by marking the array offset with an invalid number. The first active controller 112 then terminates the write operation, and the data write is complete, as noted by block 248.

If the first active controller 112 determines in block 216 that the new data will occupy a full stripe, the first active controller 112 then computes new parity by XORing all of the data blocks, as noted by block 252. The first active controller 112 then writes the data and parity to the appropriate stripe in the disk array 130, in accordance with block 256. The first active controller 112 then terminates the write operation, and the data write is complete, as noted by block 248.

Figure 3:
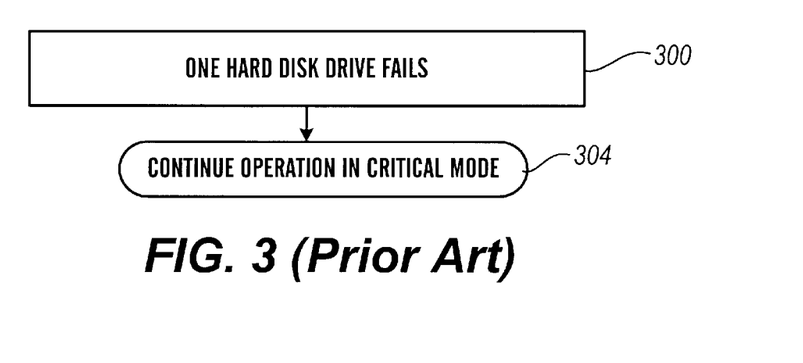
FIG. 3 is a flow chart representation of recovery from a hard disk failure using an active-active controller pair.

With reference now to FIG. 3, recovery from a failure of a disk drive in an active-active controller pair is described. Initially, a hard disk drive fails, as indicated by block 300. When this occurs, the controllers recognize that a disk drive has failed, and begin operation in critical mode, as noted by block 304. When operating in critical mode, data continues to be written and read from the disk array, and the controllers 112, 116 compensate for the failed drive using the remaining drives and the parity. For example, if disk drive 136 fails, and the first active controller 112 needs to read data from the disk array 120, the first active controller 112 determines whether the failed drive 136 contained parity or data. If the failed disk drive 136 contained data, the first active controller 112 would read the data and parity from the remaining drives in the disk array 120, and compute the data for the failed drive 136 by XORing the remaining data with the parity. If the failed disk drive 136 contained parity, the first active controller 112 would simply read the data from the remaining drives.

Figure 4:
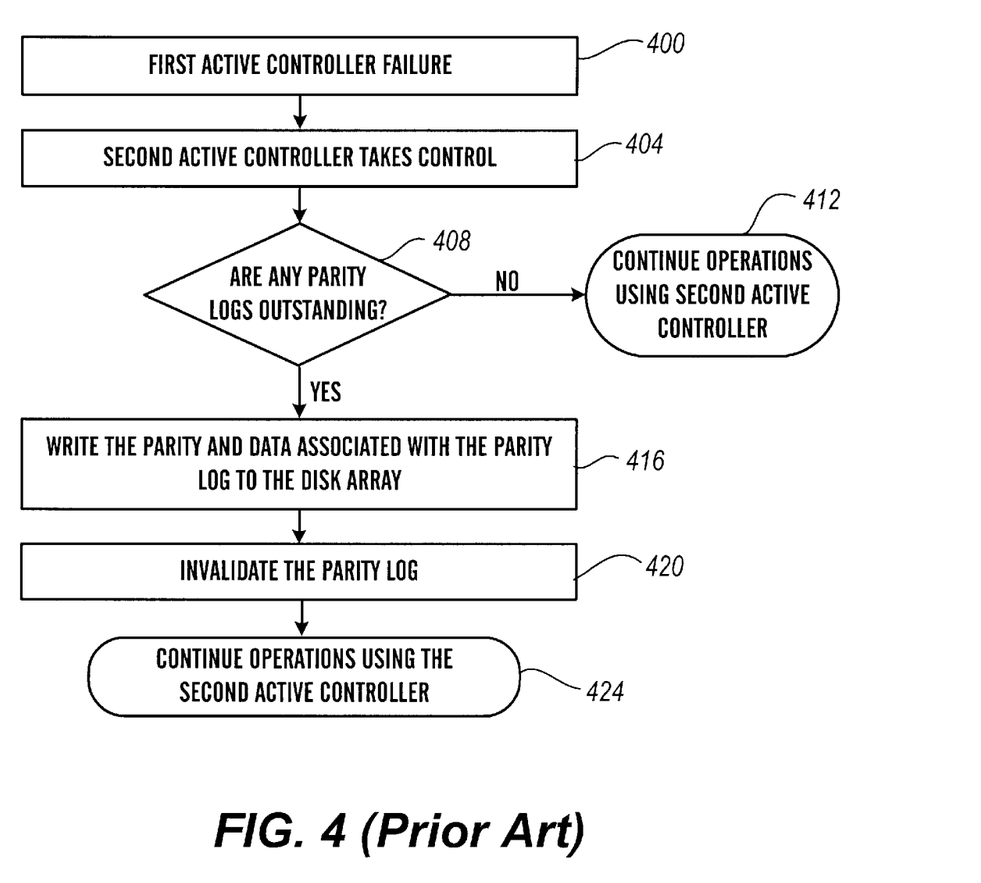
FIG. 4 is a flow chart representation of recovery from a controller failure using an active-active controller pair.

With reference now to FIG. 4, recovery from a controller failure in an active-active controller pair is now described. Initially, the first active controller 112 suffers a failure, as noted by block 400. The second active controller 116 recognizes this failure, and takes control of the operations of the first active controller 112, as indicated by block 404. The second active controller 116 then checks for the existence of any outstanding parity logs, the presence of which indicates that the first active controller 112 had data writes outstanding, according to block 408. If no data writes were outstanding on the first active controller 112, the second active controller 116 continues operations, according to block 412.

If there are parity logs outstanding, the second active controller 116 then at block 416 issues a write command to write the new data and new parity associated with the parity log to the disk array 120. Once the data and parity writes have completed, the second active controller 116 invalidates the parity log, as noted by block 420. Once all of the outstanding write operations are complete, operations are continued using the second active controller 116, as indicated by block 424.

Figure 5:
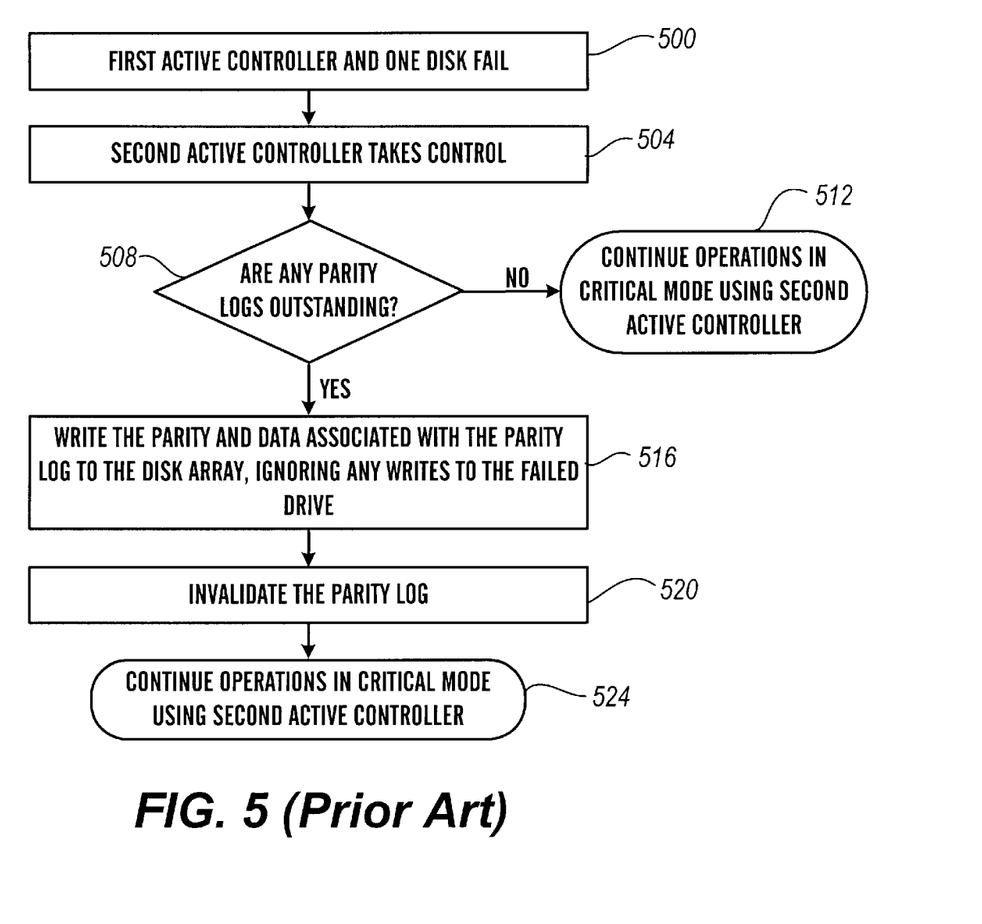
FIG. 5 is a flow chart representation of recovery from a controller and hard disk failure using an active-active controller pair.

With reference now to FIG. 5, recovery from a controller failure and a disk failure in an active-active controller pair is now described. Initially, at block 500 the first active controller 112 and one disk drive suffer a failure. The second active controller 116 recognizes the failure of the first active controller 112, and takes control of the operations that were performed by the first active controller 112, as noted by block 504. When taking control of the operations, the second active controller 116 first determines whether any parity logs are outstanding on the first active controller 112, as indicated by block 508. If no parity logs were outstanding on the first active controller 112 at the time of the failure, the second active controller 116 continues operation in critical mode, according to block 512. If parity logs were outstanding, the second active controller 116 then writes the parity and data associated with the parity log to the disk array, ignoring any writes to the failed drive, as noted by block 516.

Once the data and parity writes have completed, the second active controller 116 invalidates the parity log, in accordance with block 520. Once all of the outstanding write operations with outstanding parity logs are complete, operations are continued in critical mode using the second active controller 116, as indicated by block 524.

As can be noted from the above discussion, mirroring parity between controllers in an active-active controller pair is required in order to provide redundancy to the RAID system 100. However, the parity is mirrored between controllers using the first disk channel 124 and the second disk channel 128. Thus, mirroring the full parity consumes bandwidth from these channels, and can reduce the performance of the system. This bandwidth consumption is magnified when the data writes are for small amounts of data. For example, it is common for a stripe of data to occupy a 64 Kbyte data block on each data disk in a disk array 120, and have a 64 Kbyte parity block on the parity drive. If the host computer has a 100 Kbyte data file to be written to a stripe of data, the data will be written to at least two of the drives within the disk array 120. When writing the data, the controller writing the data, for purposes of discussion the first active controller 112, will break the data into appropriate sections, called chunks, to be stored on the individual disk drives. When writing the data, the first active controller 112 writes one chunk at a time, and computes new parity for the stripe of data for each chunk. In this example, the first active controller would compute new parity for the first chunk of data, mirror the new parity to the second active controller 116, and write the new data and parity to the disk array 120. The first active controller 112 would then perform the same tasks for the second chunk of data to complete the data write operation. Thus, for a 100 Kbyte data write, the parity block is mirrored two times, giving 128 Kbyte of mirrored parity from the first active controller 112 to the second active controller 116. The amount of mirrored data grows if, as is common, the data write requires data to be written to more than two drives in the disk array. For example, if the data write is written to three drives, 192 Kbytes of parity are mirrored for the 100 Kbyte data write. Additionally, as can be noted from the above discussion, the full parity is only required to recover from a double failure, which is a relatively infrequent event. Thus, it would be advantageous to have a method and apparatus which reduces the amount of parity that is mirrored between controllers in an active-active controller pair while still allowing for the recovery from a single failure.

SUMMARY OF THE INVENTION

The present invention provides a system and method for enhancing performance related to mirroring parity. The system includes an array of drives that stores data and parity including at least first parity associated with a first write operation. The system also includes a first controller subsystem in communication with the array of drives. The first controller subsystem includes a first controller and a memory that stores logical block address (LBA) information associated with the first write operation. The system includes a second controller subsystem in communication with the array of drives. The second controller subsystem includes a second controller involved with the first write operation including storing the first parity with the array of drives. The first LBA information includes the most recent logical block address to which data is being written using the second controller. The first controller subsystem receives a parity log message that includes the first LBA information. The first LBA information is included in the parity log message when all drives in the array of drives are usable to store data in association with the first write operation, and the parity log message includes the parity when less than all of the drives in the array of drives are usable to store data in association with the first write operation.

If the second controller fails after the first LBA information is stored with the memory and before the first parity is stored on the array of drives, the first controller subsystem uses the first LBA information to provide the first parity in association with the first write operation. If the second controller fails and less than all of the drives in the array of drives are usable to store data, and the first LBA information is stored in memory, then the LBA information is used to mark the data associated with the first write operation as missing. The first controller is used to provide an indication that the second controller has failed when less than all of the drives in the array of drives are usable. In one embodiment, the LBA information is different from a parity log and different from the first parity, with each thereof associated with the first write operation.

The method for enhancing performance related to mirroring parity includes controlling parity-related information being stored in the memory of the first controller subsystem, with the parity-related information being associated with a first write operation that is being conducted by the second controller subsystem. The first write operation is conducted using the second controller subsystem and includes storing parity on the array of drives, with the parity being different than the parity-related information. In one embodiment, the parity related information includes information related to the LBA to which data is being written using the second controller subsystem. In this embodiment, the LBA information is the most recent LBA to which data is being written using the second controller subsystem. In one embodiment, the parity-related information is part of a parity log message provided to the first controller subsystem. When less than all drives in the array are usable to store data, parity is stored in the memory of the first controller subsystem. In one embodiment, the parity-related information is less in amount and is stored in less time than the parity. The parity related information is different from a parity log that is related to an identifier associated with the first write operation. In another embodiment, the second controller subsystem includes a second controller, and when the second controller has failed after the parity-related information is stored in the memory and before the parity is stored with the array of drives, the parity related information is used by the first controller of the first controller subsystem to provide parity for the first write operation. In another embodiment, a second write operation is performed using the first controller subsystem, including storing parity related to the second write operation, and the parity-related information is not controlled when one drive of the array of drives has failed.

DETAILED DESCRIPTION

Figure 6:
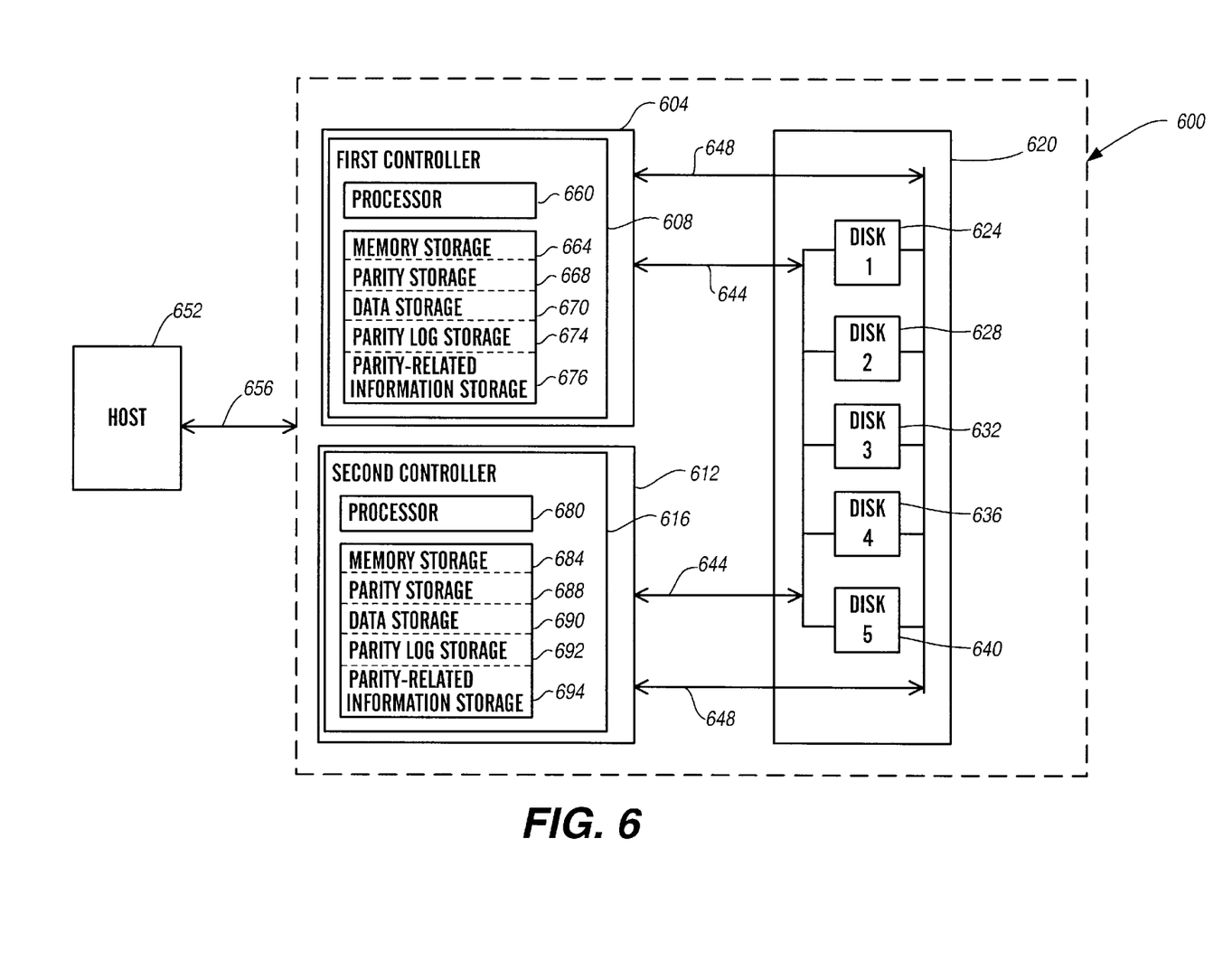
FIG. 6 is a block diagram representation of a RAID system utilizing an active-active controller pair of the present invention.

FIG. 6 is a block diagram representation of a RAID storage system 600 having an active-active controller pair. The system 600 includes a first controller subsystem 604 including a first controller 608, a second controller subsystem 612 including a second controller 616. The controller subsystems 604, 608 can also include other subsystems, such as interface subsystems (not shown) and power supply and regulation subsystems (not shown). The system includes at least one array of disk drives 620, including a number of disk drives 624, 628, 632, 636, 640, which is connected to the first controller subsystem 604 through a first disk channel 644 and a second disk channel 648 and to the second controller subsystem 612 through the first and second disk channel 648. The system 600 communicates with a host 652, over a host channel 656, and stores and retrieves information stored on the array of drives 620 as required by the host 652.

Within the first controller 608, there is a first processor 660 and a first memory storage 664. The first processor 660 is used for controlling operation of the first controller subsystem 604 and for manipulating data as required for storage and retrieval of data. The first memory storage 664 is used for temporary storage of data and parity, as well as related information, and includes a first parity storage area 668, a first data storage area 670, a first parity log storage area 672 and a first parity-related information storage area 676. Likewise, within the second controller 616, there is a second processor 680 and a second memory storage 684. The second processor 680 is used for controlling operation of the second controller subsystem 612 and for manipulating data as required for storage and retrieval of data. The second memory storage 684 is used for temporary storage of data and parity, as well as related information, and includes a second parity storage area 688, a second data storage area 690, a second parity log storage area 692, and a second parity-related information storage area 694. In one embodiment, the memory storage areas 664, 684 are non-volatile random access memory (NVRAM). In the embodiment shown in FIG. 6, the first and second memory storage 680, 684, contain separate areas for different information, however it should be noted that one or more of the listed areas could be combined with one or more of the other listed areas.

Figure 7:
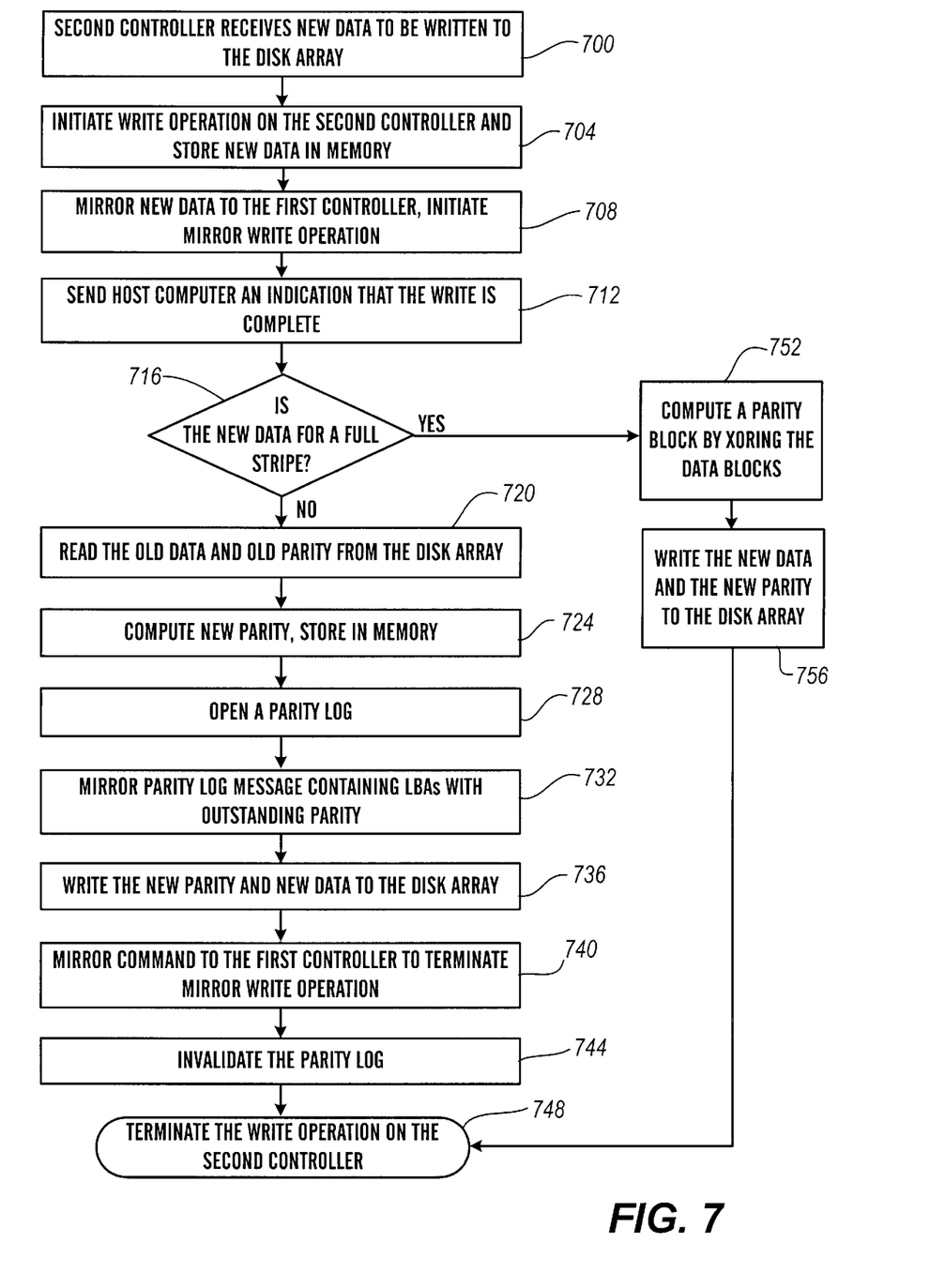
FIG. 7 is a flow chart representation of a data write using LBA mirroring.

With reference to FIGS. 6 and 7, LBA mirroring to close the RAID5 write hole and improve performance while mirroring data in an active-active RAID storage system is now described. Initially, the second controller subsystem 612 receives new data from the host computer 652 to be written to the disk array 620, in accordance with block 700. Within the second controller subsystem 612, the second controller 616 initiates a write operation and stores the new data in the second data storage area 690 within the second memory storage 684, as noted by block 704. The second controller 616 then mirrors the new data to the first controller 608 within the first controller subsystem 604 in the active-active pair, as indicated by block 708, and the first controller 608 opens a mirror write operation and stores the new data in the first data storage area 670 within the first memory storage 664. The mirror write operation indicates that there is an outstanding write operation on the second controller 616, which can be used to recover the system in the event of a failure of the second controller 16 and will be discussed in more detail below. Once the new data has been mirrored to the first controller 608, the second controller 616 sends the host computer 652 an acknowledgment that the write of the new data is complete, according to block 712. Next at block 716, the second controller 616 processes the data into blocks for storage on the disk array 620 and determines if the blocks of new data will occupy a full stripe in the disk array 620.

Referring to block 720, if the new data will not occupy a full stripe in the disk array 620, the second controller 616 reads the old data and old parity from the disk array 620. The second controller 616 then computes new parity by XORing the old data and old parity with the new data, and stores the new parity in the second parity storage area 688, as indicated by block 724. Next, a parity log is opened on the second controller 616, as noted by block 728. The parity log is stored in the second parity log storage area 692, and contains pointers to the memory storage location of the parity data and user data, the location in the drives where the data will be stored, the serial number for the drives being written, the serial number of the array the drives belong to, and an array offset. Next in block 732, the second controller 616 mirrors a parity log message to the first controller 608. The parity log message contains the logical block addresses (LBAs) of the new data blocks with outstanding parity, and the LBAs are stored in the first parity-related information storage area 676. The parity log message also includes a parity log, which is stored in the first parity log storage area 674. The LBA indicates the location within a hard disk drive where the data is to be stored and may be defined as being comprised of a substantial number of separately addressable memory locations. Accordingly, by including the LBAs in the parity log message, in the event of a failure of the second controller 616, the first controller 608 is able to determine the locations within the disk array 620 which may have inconsistent data and parity, as will be described in more detail below. With reference to block 736, the second controller 616 next issues write commands to write the new data and new parity to the disk array 620. Once the second controller 616 receives acknowledgment from the disk array 620 that the data and parity writes are complete, the second controller 616 mirrors a command to the first controller 608 to close the mirror write operation, as indicated by block 740. Next at block 744, the second controller 616 invalidates the parity log by marking the array offset with an invalid number. The second controller 616 then terminates the write operation, and the data write is complete, as noted by block 748.

If the second controller 616 determines in block 716 that the new data will occupy a full stripe, the second controller 616 then computes new parity by XORing all of the data blocks, as noted by block 752. The second controller 616 then writes the data and parity to the appropriate stripe in the disk array 620, in accordance with block 756. The second controller 616 then terminates the write operation, and the data write is complete, as noted by block 748.

Figure 8:
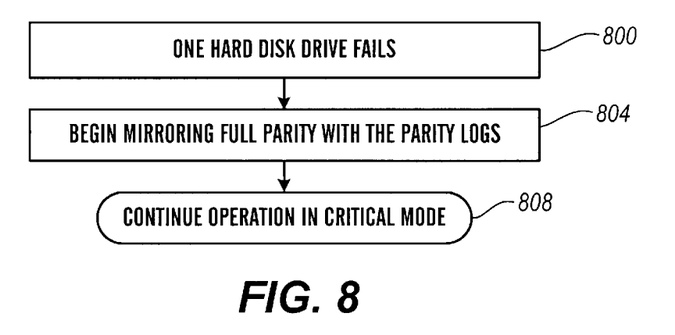
FIG. 8 is a flow chart representation of recovery from a hard disk failure when using LBA mirroring.

With reference now to FIG. 8, recovery from a failure of a disk drive when mirroring LBAs in the parity log message is described. Initially, a hard disk drive fails, as indicated by block 800. When this occurs, the controllers recognize that a disk drive has failed, and begin mirroring the full parity block in the parity log messages, rather than just the LBAs with outstanding data writes, according to block 804. The full parity block is mirrored because the controller containing the parity block may fail. In such a case, the remaining controller, if it had only the outstanding LBAs, would not be able to reconstruct the data from the missing disk drive. Thus, if the full parity block is mirrored following a disk drive failure, the system can still recover from a controller failure. The RAID system then continues operation in critical mode, as noted by block 808.

Figure 9:
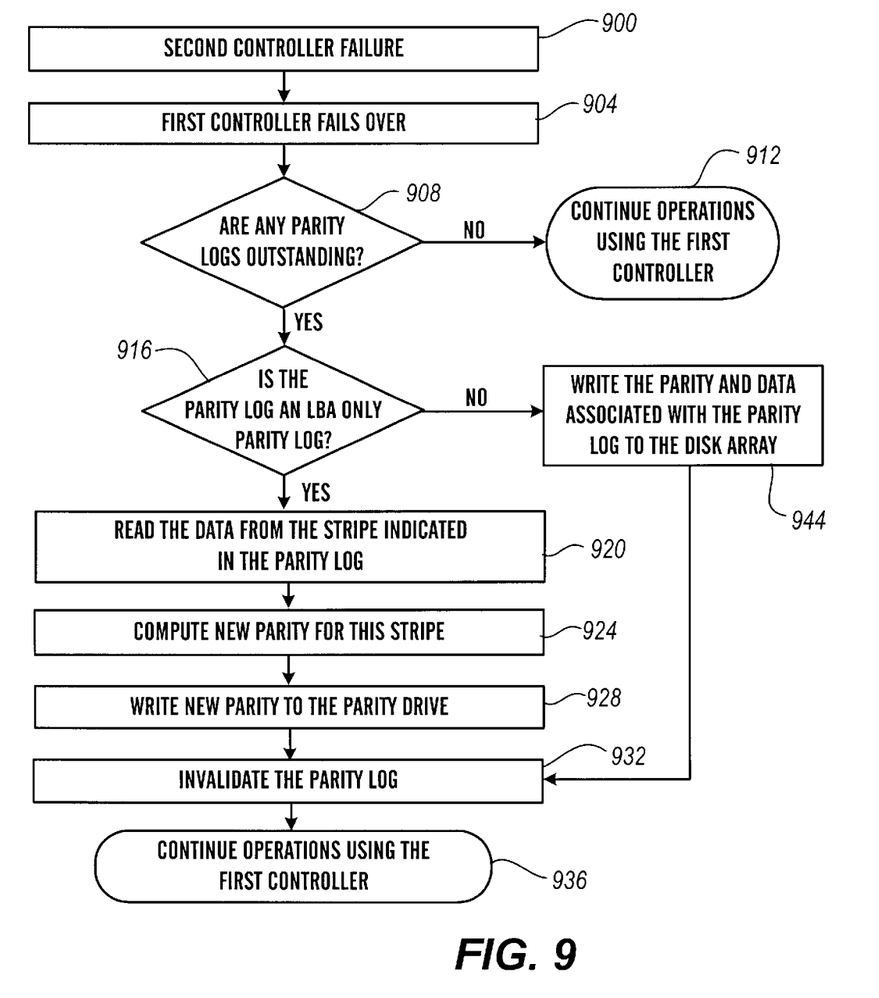
FIG. 9 is a flow chart representation of recovery from a controller failure when using LBA mirroring.

With reference now to FIG. 9, recovery from a controller failure when mirroring LBAs in the parity log message is now described. Initially, the second controller 616 suffers a failure, as noted by block 900. The first controller 608 recognizes this failure, and fails over to take control of the operations of the second controller 616, as indicated by block 904. The first controller 608 then checks for the existence of any parity logs, the presence of which indicates that the second controller 616 had data writes outstanding, according to block 908. If no parity logs were outstanding on the second controller 616, the first controller 608 continues operations, according to block 912. If there are parity logs outstanding, the first controller 608 then determines whether the parity log is an LBA only parity log, as noted by block 916.

If at block 916 the first controller 608 determines that there is an LBA only parity log showing outstanding parity, the first controller 608 then reads the stripe of data indicated in the LBA only parity log, as noted by block 920. Next at block 924, the first controller 608 generates new parity for the stripe. The first controller 608 then writes the new parity to the disk array, as noted by block 928. This new parity is generated and written to the disk array to assure that the data and parity for the stripe are consistent. The first controller 608 then, noted by block 932, invalidates the parity log. Operations are then continued using the first controller 608, as noted by block 936.

If at block 916 the first controller 608 determines that the parity log is not an LBA only parity log, the first controller 608 then issues write commands to write the new data and parity associated with the parity log to the disk array 620, as noted by block 944. Once the data and parity have been successfully stored on the disk array 620, the first controller 608 invalidates the parity log, as noted by block 932. The first controller 608 then continues operations of the system, as indicated by block 936.

Figure 10:
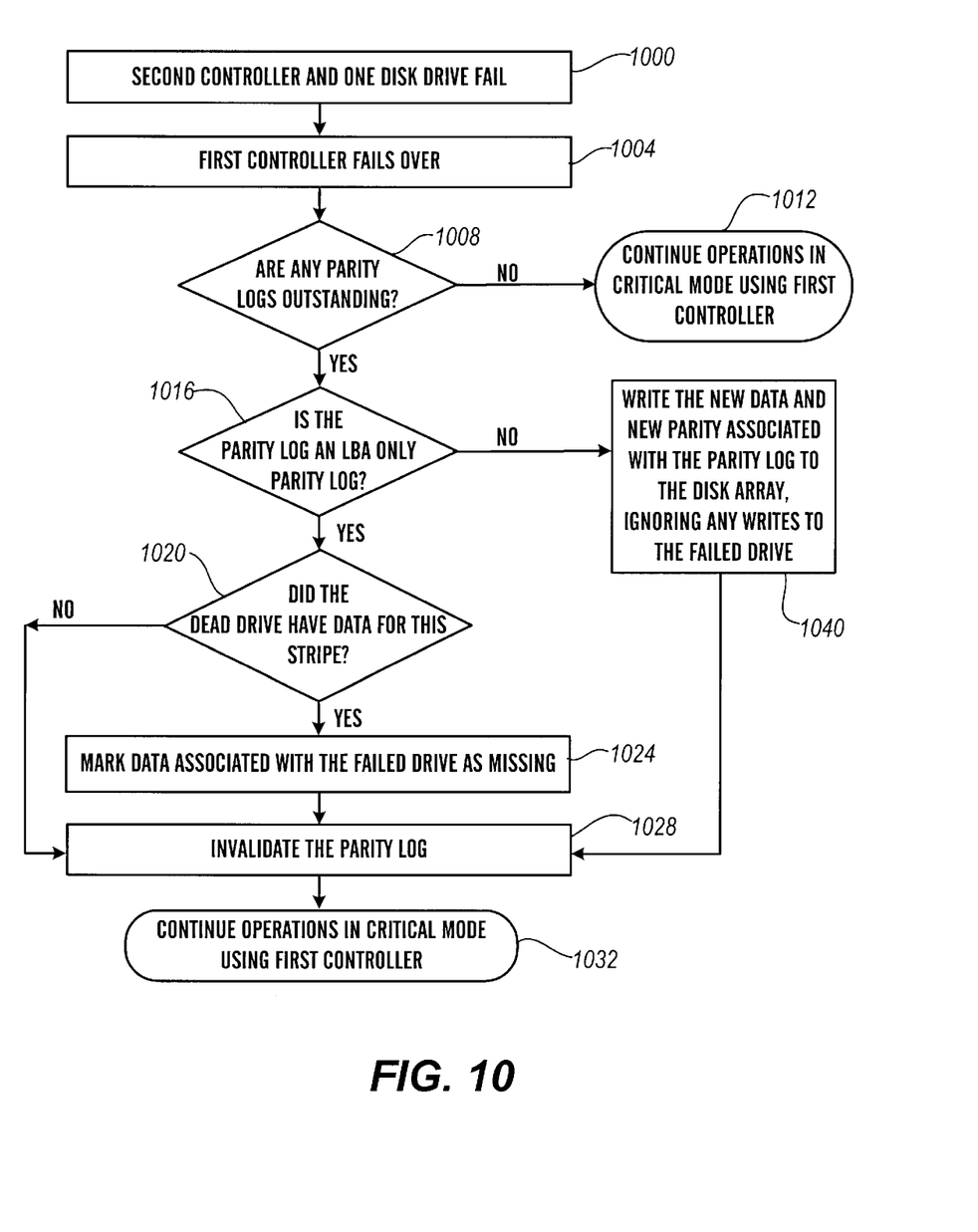
FIG. 10 is a flow chart representation of recovery from a controller and hard disk failure using LBA mirroring.

With reference now to FIG. 10, recovery from a controller failure and a disk failure using mirroring and parity logging of outstanding LBAs is now described. Initially, at block 1000 the second controller 616 and one disk drive suffer a failure. The first controller 608 recognizes the failure of the second controller 616, and fails over to take control of the operations that were performed by the second controller 616, as noted by block 1004. When taking control of the operations, the first controller 608 first determines whether any parity logs are outstanding, as indicated by block 1008. If no parity logs were outstanding on the second controller 616 at the time of the failure, the first controller 608 continues operation in critical mode, according to block 1012. If parity logs were outstanding, the first controller 608 then determines whether the parity logs are LBA only parity logs, as noted by block 1016.

Referring to block 1020, if there is an LBA only parity log, the first controller 608 then determines whether the failed drive contained parity information or data for the stripe of data indicated in the LBA only parity log. If the failed drive contained data, the first controller 608 then marks the data associated with the LBA only parity log and with the failed drive as missing, in accordance with block 1024. Next at block 1028, the first controller 608 invalidates the parity log. Once all of the outstanding mirror write operations are complete, operations are continued using the first controller 608, as indicated by block 1032.

If the first controller 608 determines that the parity log is not an LBA only parity log in block 1016, it then writes the new data and new parity associated with the parity log to the disk array, ignoring any writes to the failed drive, according to block 1040. The first controller 608 then invalidates the parity log, and continues operations in critical mode, in accordance with blocks 1028 and 1032, respectively.

Following the recovery from the double failure, the first controller 608 then continues operation of the array in critical mode. If the host computer 652 requests a read of data from a stripe in which data was marked as missing in block 1024, the first controller 608 returns an error. Alternatively, in one embodiment, if the first controller 608 receives a request for data from a stripe which had a parity write outstanding, the first controller 608 analyzes the request to determine if the data requested is contained in the LBAs which were contained in the parity log. If the read request is for data not in these LBAs, the first controller 608 returns this data if it is stored on available drives. If a portion of the data is on a failed drive, the first controller 608 returns an error.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the inventions and to enable others skilled in the art to utilize the inventions in such, or in other embodiments, and with the various modifications required by their particular application or uses of the invention. It is intended that the appended claims be construed to include alternative embodiments to the extent permitted by the prior art.

What is claimed is:

1. In a system that includes an array of drives and an active-active controller pair, a method for enhancing performance related to parity, comprising:

controlling parity-related information being stored in memory of a first controller subsystem and with said parity-related information being associated with a first write operation being conducted using a second controller subsystem; and conducting at least said first write operation to an array of drives using said second controller subsystem including storing parity on said array of drives, with said parity being different from said parity-related information.

2. A method, as claimed in claim 1, wherein:

said parity-related information includes information related to at least one logical block address (LBA) to which data is being written using said second controller subsystem.

3. A method, as claimed in claim 2, wherein:

said at least one LBA is the most recent LBA to which data is being written using said second controller subsystem.

4. A method, as claimed in claim 1, wherein:

said parity-related information is part of a parity log message provided to said first controller subsystem.

5. A method, as claimed in claim 1, wherein:

said controlling step is performed when all drives of said array are usable to store data and said parity is stored with said memory when less than all drives of said array are usable to store data.

6. A method, as claimed in claim 1, wherein:

said parity-related information is less in amount and stored in less time than said parity.

7. A method, as claimed in claim 1, wherein:

said parity-related information is different from a parity log that is related to an identifier associated with said first write operation.

8. A method, as claimed in claim 1, wherein:

said first controller subsystem includes a first controller and, when said first controller is in a failed over mode after said parity-related information is stored in said memory and before said parity is stored with said array of drives, said parity-related information is used by said first controller to provide parity for said first write operation.

9. A method, as claimed in claim 1, further including:

storing a parity log by said second controller subsystem associated with said first write operation.

10. A method, as claimed in claim 1, further including:

performing a second write operation and storing parity for said second write operation using said first controller subsystem and not controlling parity-related information associated with said second write operation when one drive of said array of drives is in a fail mode.

11. A method, as claimed in claim 10, wherein:

said performing step includes ascertaining whether said second write operation involves a full stripe of data for said array of drives.

12. A system for enhancing performance related to parity, comprising:

an array of drives that stores data and parity including at least first parity associated with a first write operation;

a first controller subsystem in communication with said array of drives, said first controller subsystem including a first controller and memory that stores at least first logical block address (LBA)-related information associated with said first write operation and does not store said first parity; and a second controller subsystem in communication with said array of drives and including a second controller involved with said first write operation including storing said first parity with said array of drives.

13. A system, as claimed in claim 12, wherein:

said first LBA-related information includes the most recent logical block address to which data is being written using said second controller.

14. A system, as claimed in claim 12, wherein:

said first controller subsystem receives a parity log message that includes said first LBA-related information.

15. A system, as claimed in claim 12, wherein:

said memory receives said first LBA-related information when all drives of said array of drives are usable to store data in association with said first write operation and said memory receives said parity when less than all of said drives of said array are usable to store data in association with said first write operation.

16. A system, as claimed in claim 12, wherein:

when said first controller is in a failed over mode and after said first LBA-related information is stored with said memory and before said first parity is stored with said array of drives, said first controller uses said first LBA-related information to provide said first parity in association with said first write operation.

17. A system, as claimed in claim 12, wherein:

when said first controller is in a failed over mode and less than all of said drives of said array are usable to store data and while said first LBA-related information is stored with said memory, data associated with said first write operation is marked as inaccessible from said array of drives.

18. A system, as claimed in claim 17, wherein:

said first controller is used in providing an indication that said first controller is in said failed over mode when less than all of said drives of said array are useable to store data.

19. A system, as claimed in claim 12, wherein:

said first LBA-related information is different from a parity log and different from said first parity with each thereof associated with said first write operation.

* * * * *